United States Patent
Pan et al.

(10) Patent No.: US 8,055,791 B2
(45) Date of Patent: *Nov. 8, 2011

(54) PROTECTING CONNECTION TRAFFIC USING FILTERS

(75) Inventors: Ping Pan, Emerson, NJ (US); Der-Hwa Gan, Fremont, CA (US); Keith E. Holleman, Santa Clara, CA (US); Manoj Leelanivas, Los Gatos, CA (US); Nischal Sheth, Sunnyvale, CA (US); Arun Vaidyanathan, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/705,713

(22) Filed: Feb. 15, 2010

(65) Prior Publication Data

US 2010/0142370 A1    Jun. 10, 2010

Related U.S. Application Data

(63) Continuation of application No. 10/869,501, filed on Jun. 16, 2004, now Pat. No. 7,680,952.

(51) Int. Cl.
*G06F 13/00* (2006.01)

(52) U.S. Cl. ......... 709/239; 709/242; 709/238; 370/237

(58) Field of Classification Search .............. 709/239, 709/238, 242; 370/237
See application file for complete search history.

(56) References Cited

U.S. PATENT DOCUMENTS

| | | | |
|---|---|---|---|
| 7,031,262 B2 * | 4/2006 | Vasseur et al. | 370/248 |
| 7,188,189 B2 * | 3/2007 | Karol et al. | 709/238 |
| 7,230,913 B1 * | 6/2007 | Vasseur et al. | 370/216 |
| 7,242,665 B2 * | 7/2007 | Langille et al. | 370/217 |
| 7,545,735 B1 * | 6/2009 | Shabtay et al. | 370/217 |
| 7,602,702 B1 * | 10/2009 | Aggarwal | 370/217 |
| 7,606,235 B1 * | 10/2009 | Ayyangar et al. | 370/395.21 |
| 7,680,952 B1 * | 3/2010 | Pan et al. | 709/239 |
| 2002/0097730 A1 * | 7/2002 | Langille et al. | 370/401 |
| 2002/0112072 A1 * | 8/2002 | Jain | 709/239 |
| 2004/0199662 A1 * | 10/2004 | Karol et al. | 709/238 |
| 2005/0259664 A1 * | 11/2005 | Vasseur et al. | 370/395.52 |
| 2006/0268682 A1 * | 11/2006 | Vasseur | 370/216 |

* cited by examiner

*Primary Examiner* — Kenneth R Coulter
(74) *Attorney, Agent, or Firm* — John C. Pokotylo; Straub & Pokotylo

(57) ABSTRACT

A connection between network nodes in a communication network is backed up. A failover label-switched path (LSP) is created starting at a first network node of a connection and ending 5 at the second node of the connection, while bypassing the protected connection. In the event of connection failure, data is transmitted through the failover LSP. A network operator can selectively protect different types of data by using filters that bind one or more types of traffic received over one or more interfaces to different failover LSPs.

18 Claims, 9 Drawing Sheets

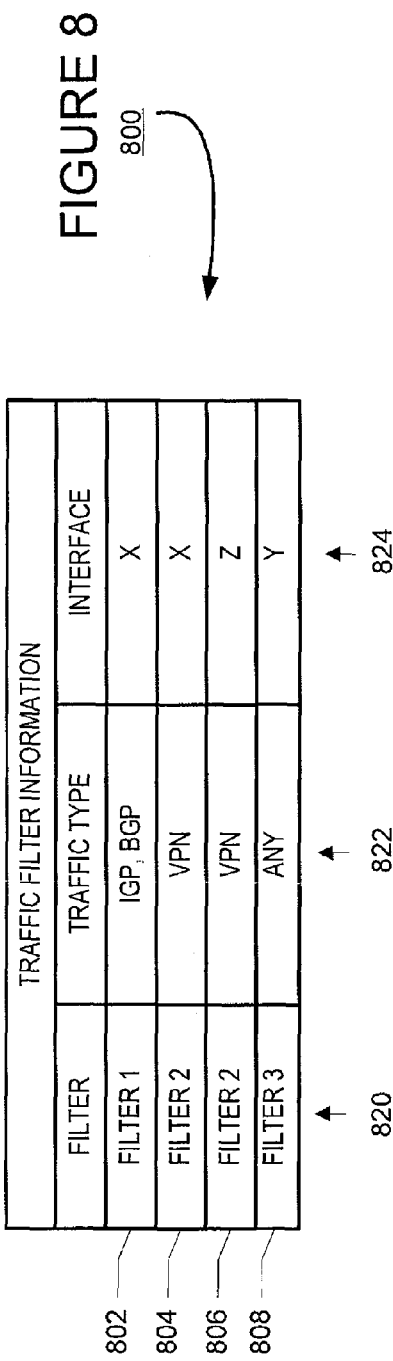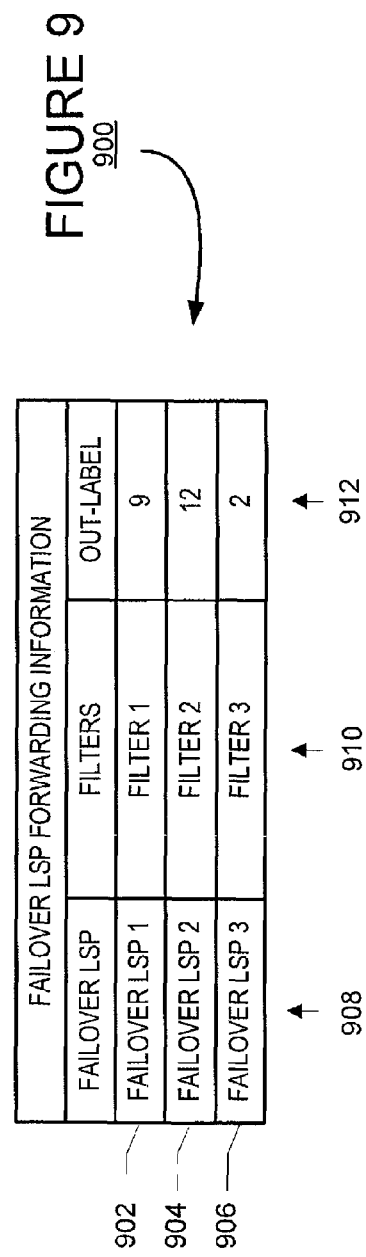

PROTECTING CONNECTION TRAFFIC USING FILTERS

§0. RELATED APPLICATIONS

The present application is a continuation of U.S. patent application Ser. No. 10/869,501 (referred to as "the '501 application" and incorporated herein by reference), which issued as U.S. Pat. No. 7,680,952, filed on Jun. 16, 2004, titled "PROTECTING CONNECTION TRAFFIC USING FILTERS," and listing Ping Pan, Der-Hwa Gan, Der-Hwa Gan, Keith E. Holleman, Manoj Leelanivas, Nischal Sheth and Arun Vaidyanathan as the inventors.

§1. BACKGROUND OF THE INVENTION

§1.1 Field of the Invention

The present invention concerns protecting traffic over communication networks and more specifically, using label switched paths (LSPs) to backup communication network connections.

§1.2 Background Information

The description of art in this section is not, and should not be interpreted to be, an admission that such art is prior art to the present invention. Communication networks, nodes and connections, as well as the need for connection failovers, are introduced in §1.2.1. Then, known connection failover techniques and their shortcomings are introduced in §1.2.2.

§1.2.1 Communication Networks and the Need for Connection Failovers

FIG. 1 illustrates an exemplary communications system 100. Communications system 100 includes a plurality of network nodes A-D 110, 120, 130, 140, and connections 105, 115, 125, 135 and 145. The network nodes (e.g., routers) may be located at remote geographic locations. The network nodes may include physical interfaces (e.g., ports) for receiving and transmitting data. The connections may include a communications link, an interface terminating the link at the source node, and an interface terminating the link at the destination node. The communications link may be any known communications medium such as copper wire, fiber optic cables, or wireless channels, for example.

A connection can fail. For example, one of the interfaces may fail, or the communications link may fail. When a connection failure occurs, most packet switching networks can determine a new route bypassing the failed connection. However, determining such a new route can take a relatively long time. During this time data packets may be lost. For some applications, such packet loss is unacceptable.

§1.2.2 Known Connection Backup Techniques and their Shortcomings

Mirroring connections and fast-reroute are known connection backup techniques. A mirror connection may provide a separate backup connection for backing up a primary connection. In communication system 100, for example, network node A 110 and network node B 120 can communicate data via a primary connection 105, as well as via a mirror connection 115. At each node, 110, 120, the mirror connection 115 has a different interface than that of the primary connection. Generally, the mirror connection 115 exhibits the identical configuration (e.g., in terms of IP addressing and Maximum Transmission Unit (MTU)) as the primary connection 105. When a connection failure occurs at the primary connection 105, data is automatically switched over to the mirror connection 115. Unfortunately this technique requires duplicate physical interfaces assigned at the source and destination nodes. Thus, mirroring is not attractive in terms of cost and scalability.

Fast-reroute can also be used. Fast-reroute uses failover resource reservation protocol (RSVP) LSPs. Fast-reroute establishes, between a pair of routers, a backup LSP for data packets that belong to a specific set of RSVP multi-protocol label switched (MPLS) sessions. When a connection failure occurs, data carried by specific RSVP MPLS sessions is forwarded to the next-hop node via the backup LSP. Since the original RSVP MPLS sessions already have a label, to perform the label switching when the data is monitored over to the backup LSP, the backup LSP can use the MPLS label stacking feature to forward the data.

Unfortunately the fast-reroute technique has a number of shortcomings. For an RSVP MPLS session to be qualified for this protection, it must encode the "local-protection-desired" flag in its RSVP Session Attribute Object (See the paper Awduche, et al., "RSVP-TE-Extensions to RSVP for LSP Tunnels", Request for Comments 3209 (Internet Engineering Task Force, December 2001)) (incorporated herein by reference and referred to as "RFC 3209".). Without this flag activated, an RSVP MPLS session will not be protected over a failed connection. The encoding of the flag can only be performed at the traffic-originating ingress node. Accordingly, fast-reroute lacks flexibility and granularity. A network operator may want to protect user traffic on a particular connection, regardless of traffic type or origin. Since the fast-reroute technique requires a flag to be set at the ingress node, it will only work for RSVP MPLS type traffic. A network operator would not be able to protect non RSVP MPLS type traffic. Further, if a particular ingress node is not equipped to set the required flag, data originating from that node cannot be protected.

In addition, network operators may want to protect user traffic based on their routing classification, such as internal traffic (e.g., managed via interior gateway protocol (IGP) such as Intermediate System-Intermediate System (IS-IS) and Open Shortest Path First (OSPF)), transit traffic (e.g., managed using inter-domain protocol such as border gateway protocol (BGP)), or tunnel virtual private network (VPN) traffic, where tunnels may be managed using not only RSVP, but by other MPLS protocols such as label distribution protocol (LDP). The fast-reroute technique is limited to RSVP MPLS sessions with a particular flag activated.

Therefore, it may be useful to provide a connection failover that overcomes these and other disadvantages.

§2. SUMMARY OF THE INVENTION

The present invention discloses apparatus, data structures and methods for backing up a connection between network nodes in a communication network. A failover label-switched path (LSP) may be created starting at a first network node of a connection and ending at the second node of the connection, while bypassing the protected connection. In the event of connection failure, data may be transmitted through the failover LSP. A network operator can selectively protect different types of data by using filters that bind one or more types of traffic received over one or more interfaces to different failover LSPs.

§3. BRIEF DESCRIPTION OF THE DRAWINGS

FIG. 8 illustrates an exemplary traffic filter information data structure of the present invention.

FIG. 9 illustrates an exemplary failover LSP forwarding information data structure of the present invention.

§4. DETAILED DESCRIPTION

Figure 1:
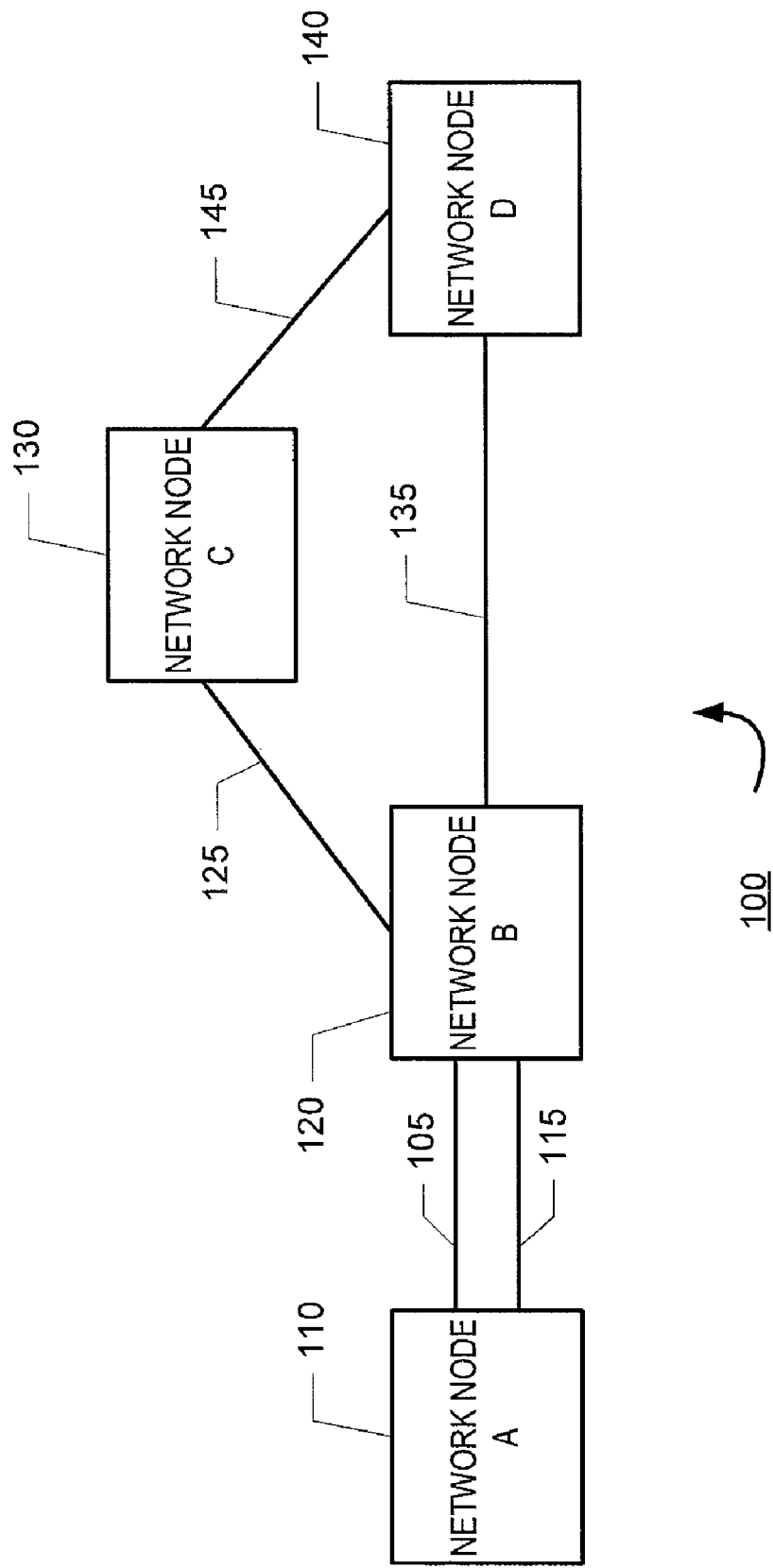
FIG. 1 illustrates an exemplary communications system

Methods, apparatus, and data structures consistent with the principles of the invention protect communications connections. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, exemplary environments in which the principles of the invention may operate are described in §4.1. Then, high-level functions that may be performed by the invention are introduced in §4.2. Thereafter, exemplary methods and data structures consistent with the principles of the invention are described in §4.3. In §4.4, exemplary operations of an exemplary embodiment of the invention are described. Exemplary apparatus consistent with the principles of the invention are described in §4.5. Finally, some conclusions regarding the principles of the invention are provided in §4.6.

§4.1 Environments in which the Present Invention May Operate

Embodiments in which the principles of the present invention may be used include communication systems including nodes for forwarding addressed data, such as packets. Such nodes may be routers having a control component and a forwarding component. Some nodes in the communication system may support LSPs. Although LSPs are understood by those skilled in the art, they are introduced below in §4.1.1. Then, an exemplary node is introduced in §4.1.2

§4.1.1 Label-Switched Paths

It is often desirable to establish a path through at least a part of a packet-switched network for at least some packets. Many known routing protocols have limitations that do not make them reliable for establishing such paths. Using known routing protocols (e.g., shortest path algorithms) to determine such paths is often unacceptable.

Label-switching can be used to establish a path from a head-end node (e.g., an ingress router) to a tail-end node (e.g., an egress router). The path may be determined using known protocols, such as RSVP or LDP. Once a path is determined, each router in the path may be configured manually or via some signaling mechanism to forward packets to a peer router in the path (e.g., a "downstream" or "upstream" neighbor). Routers in the path determine that a given set of packets (e.g., a flow) are to be sent over the paths, as opposed to being routed individually, based on labels added to the packets.

The operation of forwarding a packet to a next hop based on address information can be thought of as two steps—partitioning the entire set of possible packets into a set of forwarding equivalence classes (FECs), and mapping each FEC to a next hop. As far as the forwarding decision is concerned, different packets which get mapped to the same FEC are indistinguishable. With MPLS LSPs, a particular packet is assigned to a particular FEC just once, as the packet enters the label-switched domain part of the network. The FEC to which the packet is assigned is encoded as a label, typically a short, fixed length value. Thus, at subsequent nodes, no further header analysis need be done—all subsequent forwarding over the label-switched domain is driven by the labels. Such FECs may be generalized such that particular ports, wavelengths, time slots, channels, etc. are used instead of labels.

Figure 2:
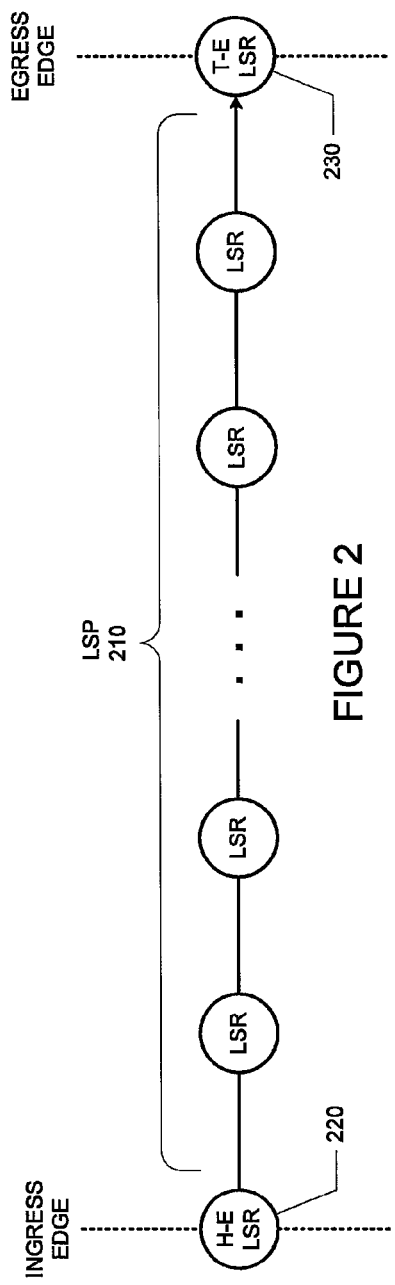
FIG. 2 illustrates an LSP including a head-end (or ingress) LSR, an intermediate LSR, and a tail-end (or egress) LSR.

FIG. 2 illustrates an LSP 210 across a network. Notice that LSP 210 is simplex—traffic flows in one direction from a head-end label-switching router (or "LSR") 220 at an ingress edge to a tail-end LSR 230 at an egress edge. Generally, duplex traffic requires two LSPs—one for each direction. However, some protocols support bi-directional LSPs. Notice that LSP 210 is defined by the concatenation of one or more label-switched hops, allowing a packet to be forwarded from one LSR to another across LSP 210. LSP 210 may also be referred to as the MPLS domain.

Figure 3:
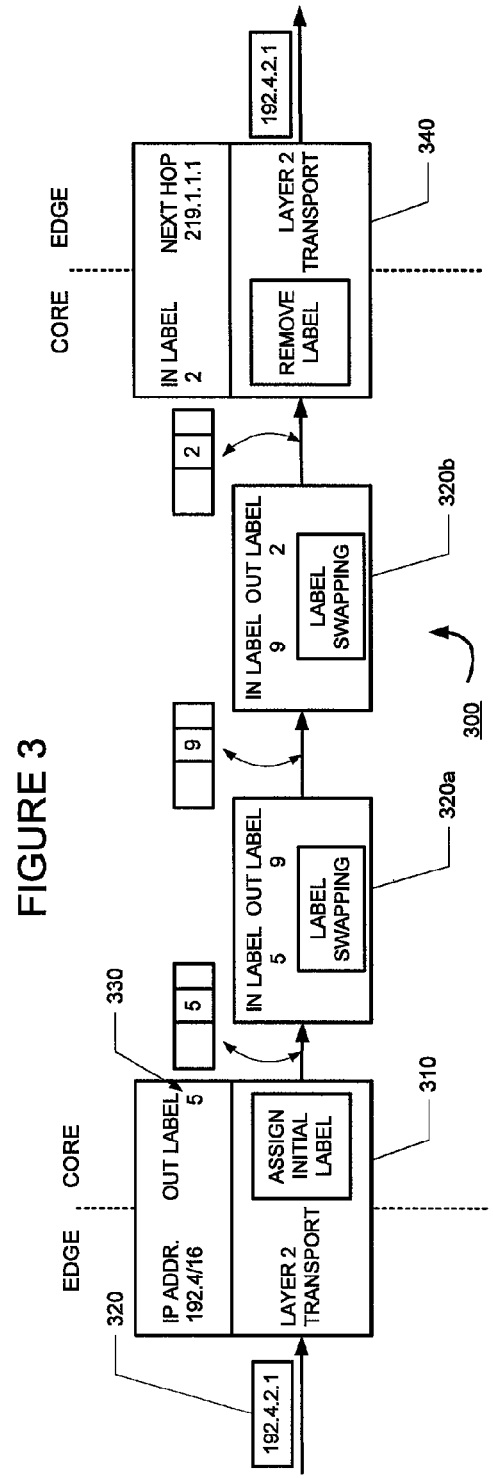
FIG. 3 illustrates label assignment, switching and popping by label-switching routers of a label-switched path.

FIG. 3 illustrates how an LSP may work. At the ingress edge of the network, each packet is assigned an initial label (e.g., based on all or a part of its layer 3 destination address). More specifically, an ingress LSR 310 interprets the destination address 320 of an unlabeled packet, performs a longest-match routing table lookup, maps the packet to an FEC, assigns a label 330 (e.g., label 5) to the packet and forwards it to the next hop in the LSP.

In the MPLS domain, the LSRs 320 ignore the network layer header of the packet and simply forward the packet using label-swapping. More specifically, when a labeled packet arrives at an LSR, the input port number and the label are used as lookup keys into an MPLS forwarding table. When a match is found, the forwarding component retrieves the associated outgoing label, the outgoing interface (or port), and the next hop address from the MPLS forwarding table. The incoming label is replaced with the outgoing label and the packet is directed to the outgoing interface for transmission to the next hop in the LSP. FIG. 3 illustrates such label-switching by LSRs 320a and 320b (e.g., label 5 is replaced with label 9 at 320a and label 9 is replaced with label 2 at 320b).

When the labeled packet arrives at egress LSR 340, if the next hop is not an LSR, egress LSR 340 discards ("pops") the label and forwards the packet using conventional (e.g., longest-match IP) forwarding. FIG. 3 illustrates such label popping and IP forwarding by egress LSR 340 (e.g., label 2 is replaced with address 192.4.2.1).

In the example illustrated, each LSR had appropriate forwarding labels. Labels are normally provisioned in one of two ways. With static LSPs, labels are manually assigned on all routers involved in the path. No signaling operations by the nodes are needed. With protocol-signaled LSPs, routers establish LSPs by mapping network-layer routing information directly to data link layer switched paths using known label-signaling protocols, such as LDP and RSVP.

§4.1.2 Exemplary Router

Figure 4:
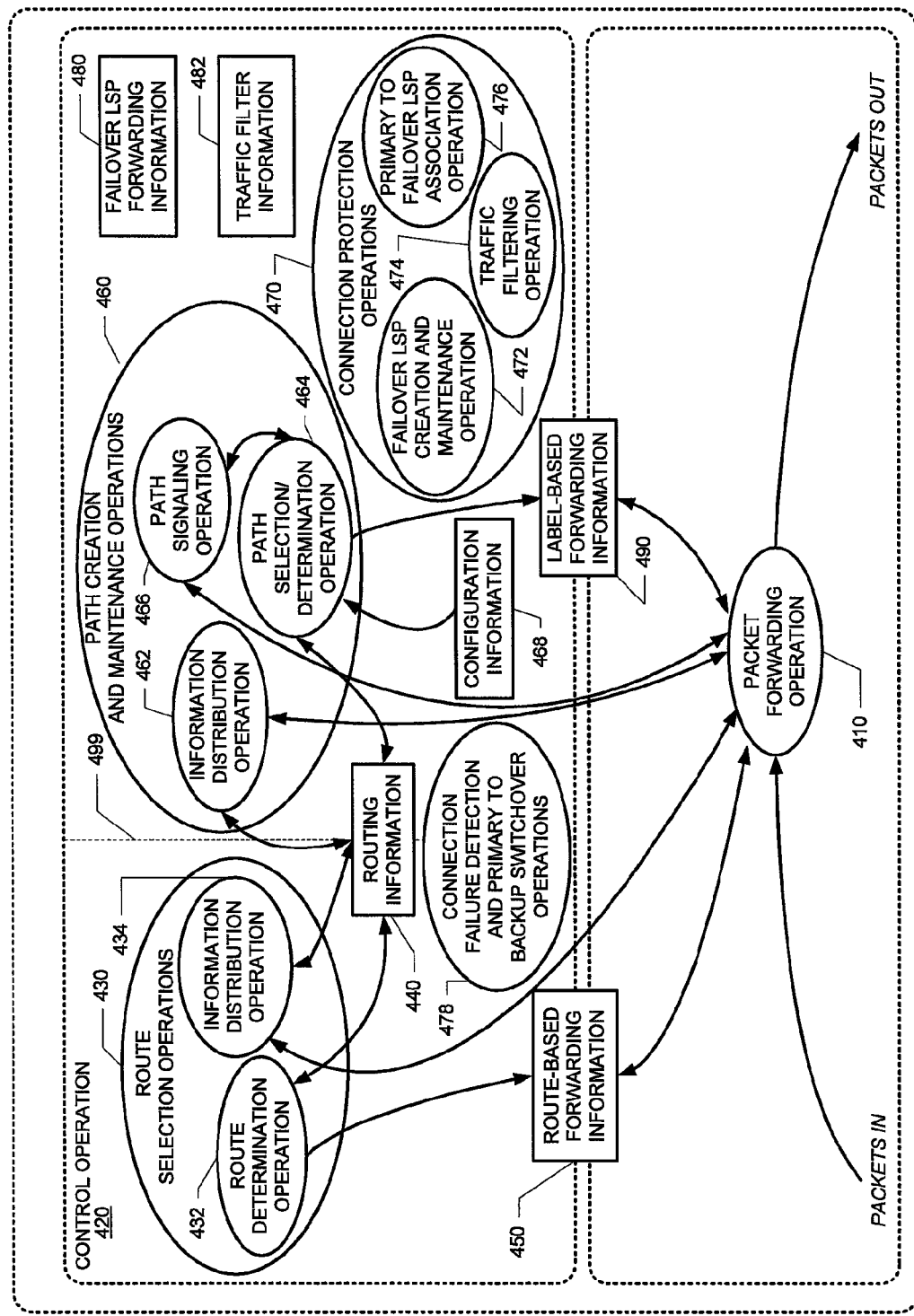
FIG. 4 is a bubble chart of a router in which the present invention may be used.

FIG. 4 is a bubble-chart of an exemplary router 400 in which the principles of the invention may be used. Router 400 may include a packet forwarding operation 410 (part of a "data plane") and a control operation 420 (e.g., routing) (part of a "control plane"). Packet forwarding operation 410 may forward received packets based on route-based forwarding information 450 and/or based on label-based forwarding information 490, such as LSP information.

Regarding control operation 420, the operations and information depicted to the right of dashed line 499 are related to creating and maintaining virtual links, such as LSPs, while the operations and information depicted to the left of the dashed line 499 are related to creating routes. These operations and information needn't be performed and provided, respectively, on all routers of a network.

The route selection operations 430 include information distribution operation 434 and route determination operation 432. Information distribution operation 434 may be used to discover network topology information, store it as routing information 440, and distribute such information. Route determination operation 432 may use routing information 440 to generate route-based forwarding information 450.

The path creation and maintenance operations 460 may include an information distribution operation 462, a path selection/determination operation 464, and a path signaling operation 466. Information distribution operation 462 may be used to obtain information about the network, store such information as path information (not shown), and distribute such information. Path determination/selection operation 464 may use routing information 440 and the path information and/or configuration information 468 to generate label-based forwarding information 490, such as LSPs for example. Path signaling operation 466 may be used to accept and disseminate signal label-based forwarding information.

Exemplary router 400 also includes connection protection operation 470. Connection protection operations 470 may include a failover LSP creation and maintenance operation 472, a traffic filtering operation 474, and a primary-to-failover LSP association operation 476. Consistent with the principles of the invention, when a protected connection fails, data is forwarded to the nexthop via an LSP. This LSP is called a failover LSP. Thus, failover LSP creation and maintenance operation 472 may be used to create and maintain the failover LSP or LSPs that are used to backup a connection. Traffic filtering operation 474 may be used to separate traffic through a node into different filters. The filters allow a network operator to control the types of traffic they wish to protect. This information may be stored as traffic filter information 482. Primary-to-failover LSP association operation 476 may be used to associate filters with failover LSPs. The resulting associations may be stored in failover LSP forwarding information 480. Primary-to-failover LSP association operation 476 may also be used to update route-based forwarding information 450 and label-based forwarding information 490 with the appropriate failover LSP information. Storing the failover LSP information with route-based forwarding information 450 and label-based forwarding information 490 allows packet forwarding operation 410 to quickly switch over and use the failover LSP to forward received data, in the event of a connection failure.

Exemplary router 400 may also include a connection failure detection and primary to failover switchover operation 478. When a connection failure occurs, connection failure detection and primary to failover switchover operations 478 detects the failure and switches the appropriate next hop information in route-based forwarding information 450 and label-based forwarding information 490 to their associated failover LSPs. In this manner, protected received data that would normally be forwarded over the failed connection are forwarded instead over the failover LSP.

§4.2 High-Level Functions

One high-level function consistent with the principles of the invention may be to backup a connection, such as a connection in a communications network, using LSPs.

Another high-level function may be to filter traffic based on a traffic type or classification. Different filters can then be used to protect different types of data using different failover LSPs. For example, internal network data may be more important to a network operator than inter-domain or tunneled VPN traffic. Such traffic may be associated with a faster or more robust failover LSP.

§4.3 Exemplary Methods and Data Structures

Exemplary methods and data structures for performing the functions summarized in §4.2, are described below in §§4.3.1 and 4.3.2, respectively.

§4.3.1 Exemplary Methods

Exemplary methods for configuring connection protection, responding to a connection state change (such as a failure) and forwarding data are described below.

§4.3.1.1 Configuring Connection Protection

Figure 5:
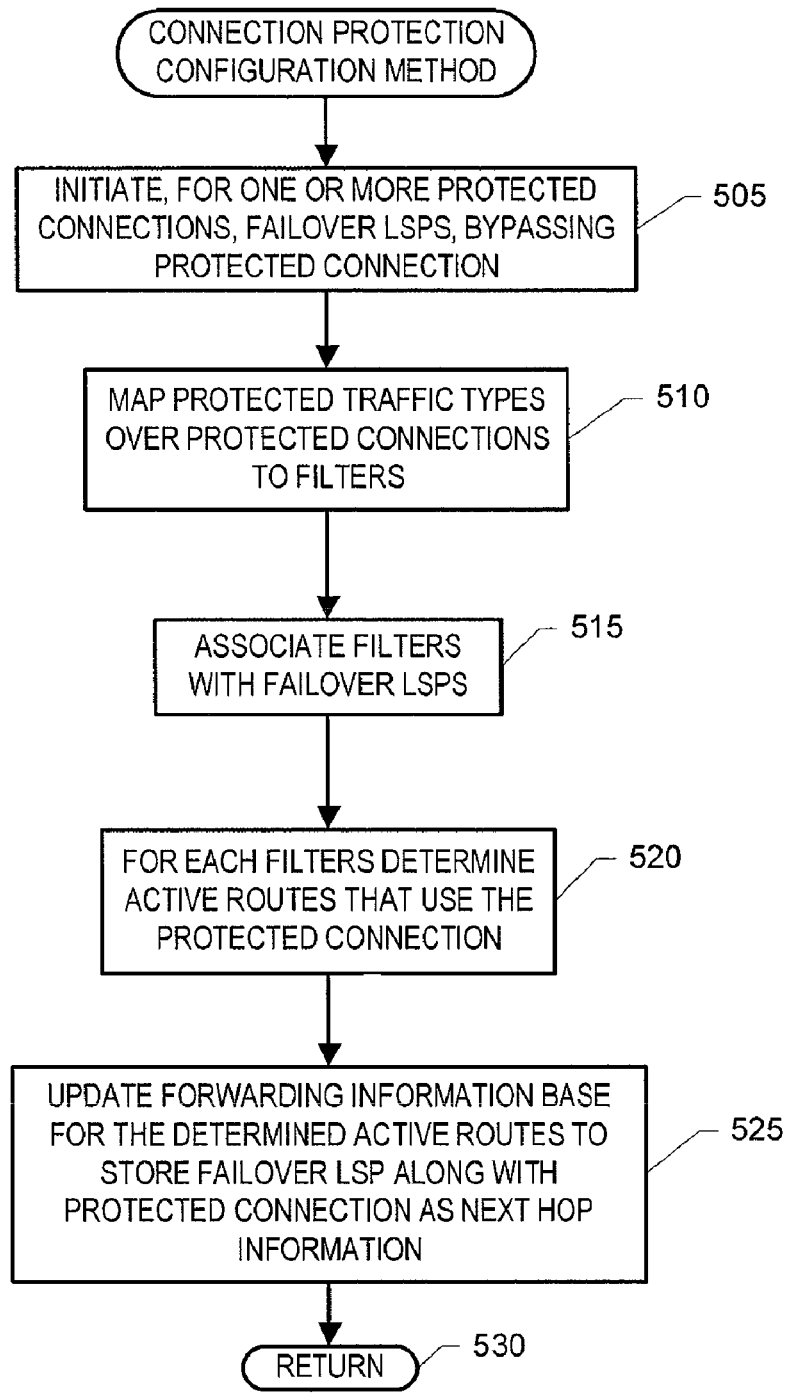
FIG. 5 is a flow chart illustrating an exemplary connection protection setup method consistent with the principles of the present invention.

FIG. 5 illustrates an exemplary connection protection configuration method that may be used to perform various connection protection operations 470. A network node initiates failover LSPs for one or more protected connections (act 505). A constrained shortest path first (CSPF) algorithm may be used to determine the failover LSPs. The constraint applied would be to bypass the protected connection.

One or more protected traffic types transmitted through protected connections are mapped to one or more filters (act 510). Some examples of different types of traffic include intra-domain (e.g., OSPF, IS-IS) traffic, inter-domain (e.g., BGP) traffic and MPLS tunneled (e.g., VPN) traffic. Traffic from different domains may be differentiated by the domain's autonomous system (AS) value (e.g., IP address). This information may be stored in traffic filter information base 482. Then, the filters are associated with failover LSPs (act 515). This information may be stored in failover LSP forwarding information 480.

For each filter, active routes that use the protected connection are determined (act 520). Then, the forwarding information base for the determined active routes is updated to store their associated failover LSP along with the protected connection as next hop information (act 525). The connection protection configuration method is then left via RETURN node 530.

§4.3.1.2 State Change Connection (Failure) Response

Figure 6:
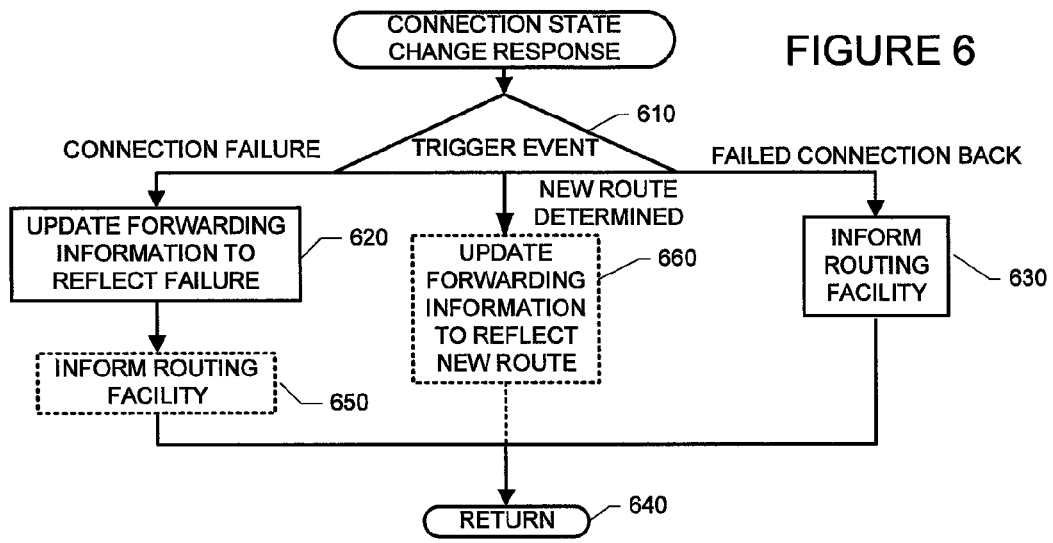
FIG. 6 is a flow chart illustrating an exemplary connection state change response method consistent with the principles of the present invention.

FIG. 6 illustrates an exemplary connection failure response method that may be used to perform various connection failure detection and primary to failover switchover operations 478. Acts depicted in phantom pertain to a particular embodiment, described later. Various acts of connection failure response method are initiated based on a trigger event (610). For example, if a connection failure is indicated, forwarding information may be updated to reflect such a connection failure (act 620), before the method is left via RETURN node 640. A failed connection may be indicated by a dropped packet or a failed probe message, for example. Thus, packets that would otherwise be forwarded over a failed connection can instead be forwarded over a failover LSP.

Referring back to trigger 610, if a failed connection comes back (i.e., if the failed connection begins functioning again), a routing facility may be informed (act 630) before the method is left via RETURN node 640. Thus, for example, packets could continue to be forwarded based on a failover LSP that was used as a backup to the failed connection. When the routing facility determines a new "next hop", it can update the forwarding table accordingly.

One embodiment consistent with the principles of the invention is depicted with phantom lines. More specifically, in the event of a connection failure, in addition to updating the forwarding information (act 620), the routing facility could also be informed (act 650). The routing facility could then determine a new route. Once a new route is determined, the forwarding information could then be appropriately updated to reflect the new route (act 660). Since re-computing a route may be computationally expensive, this embodiment minimizes traffic loss during such re-computation.

§4.3.1.3 Data Forwarding

Figure 7:
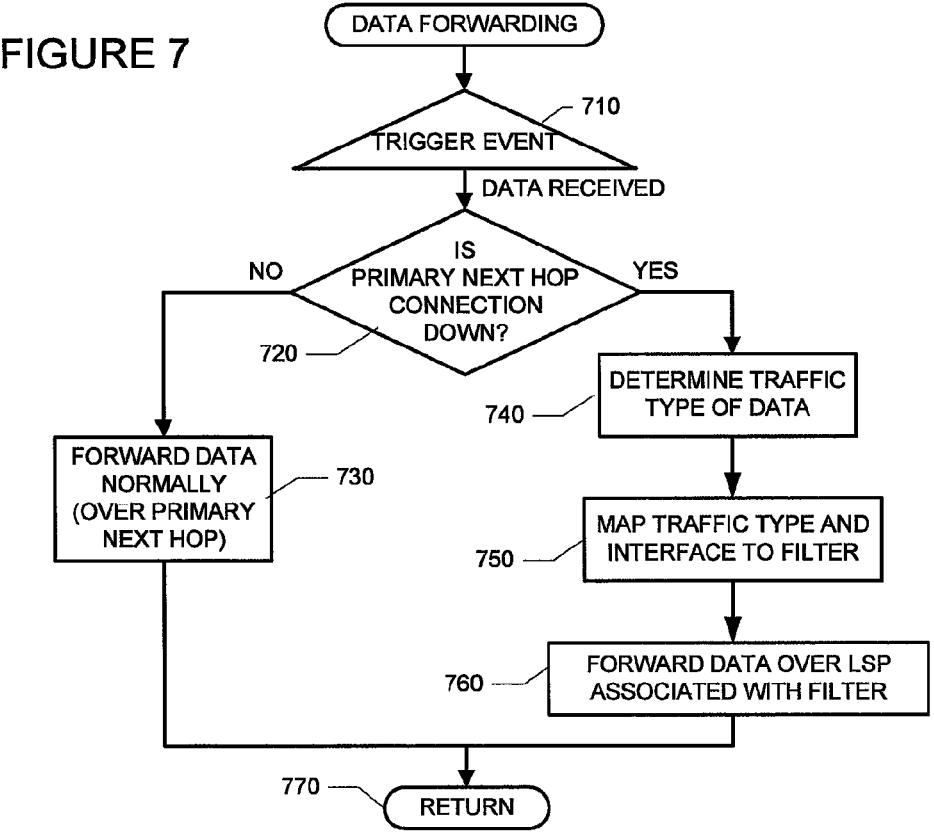
FIG. 7 is a flow chart illustrating an exemplary data forwarding method consistent with the principles of the present invention.

FIG. 7 illustrates an exemplary data forwarding method that may be used to perform various failover operations 478. As indicated by trigger event 710, the main portion of the method is performed when data is received. Referring to decision 720 if the primary next hop connection is not down, the received data is forwarded normally (act 730)—that is, over the primary next hop. The method is then left via RETURN node 770. Referring again to decision 720, if the primary next hop connection is down, the traffic type of the received data is determined (act 740), the determined traffic type and the interface on which the data was received are mapped to a filter (act 750) and the received data is forwarded over the LSP associated with the filter (act 760) before the method is left via RETURN node 770.

§4.3.2 Exemplary Data Structures

Exemplary data structures for storing traffic filter information and failover LSP forwarding information are described below in §§4.3.2.1 and 4.3.2.2, respectively.

§4.3.2.1 Exemplary Traffic Filter Information Base

FIG. 8 illustrates an exemplary traffic filter information base 800 which may be used to implement traffic filter information 482 of FIG. 4, for example. Traffic filter information base 800 may include a column of filter identifiers 820 and columns of traffic types 822 and the interfaces 824 on which the traffic enters the network node, associated with each traffic filter, respectively.

In the simplified example shown, traffic filter information base 800 includes three filters. Filter 1 is associated with IGP and BGP type traffic received on interface X (row 802). Filter 2 is associated with VPN type traffic received on interface X (row 804), as well as VPN type traffic on interface Z (row 806). Filter 3 is associated with all types of traffic received on interface Y (row 808). Additional filters may be created and added to information base 800 to protect specific types of traffic received on different interfaces of a network node.

§4.3.2.2 Exemplary Failover LSP Forwarding Information Base

FIG. 9 illustrates an exemplary failover LSP forwarding information base 900, which may be used to implement failover LSP forwarding information 480 of FIG. 4, for example. In addition to assigning traffic types and interfaces to filters, the created filters are associated with failover LSPs. That associated information is stored in failover LSP forwarding information base 900. Failover LSP forwarding information base 900 may include a column of failover LSPs 908, a column of filters 910, and a column of out-labels 912 used by failover LSPs.

In the simplified example shown, failover LSP forwarding information base 900 includes three failover LSPs. Failover LSP 1 is associated with filter 1 and uses an out-label of 9 (row 902). Failover LSP 2 is associated with filter 2 and uses an out-label of 12 (row 904). Finally, failover LSP 3 is associated with filter 3 and uses an out-label of 2 (row 906). Additional failover LSPs may be created to protect different connections.

As can be appreciated from the foregoing description, filters may be used to "bind" failover LSPs and their labels with one or more traffic types received on one or more interfaces.

§4.4 Operational Example of an Exemplary Embodiment

Exemplary operations consistent with the principles of the invention are discussed below. An exemplary connection failover operation of the invention when protecting routed data is described in §4.4.1. Then, an exemplary connection failover operation of the invention when protecting label-switched data is described in §4.4.2.

§4.4.1 Connection Failover Operation for Routed Data

Figure 10:
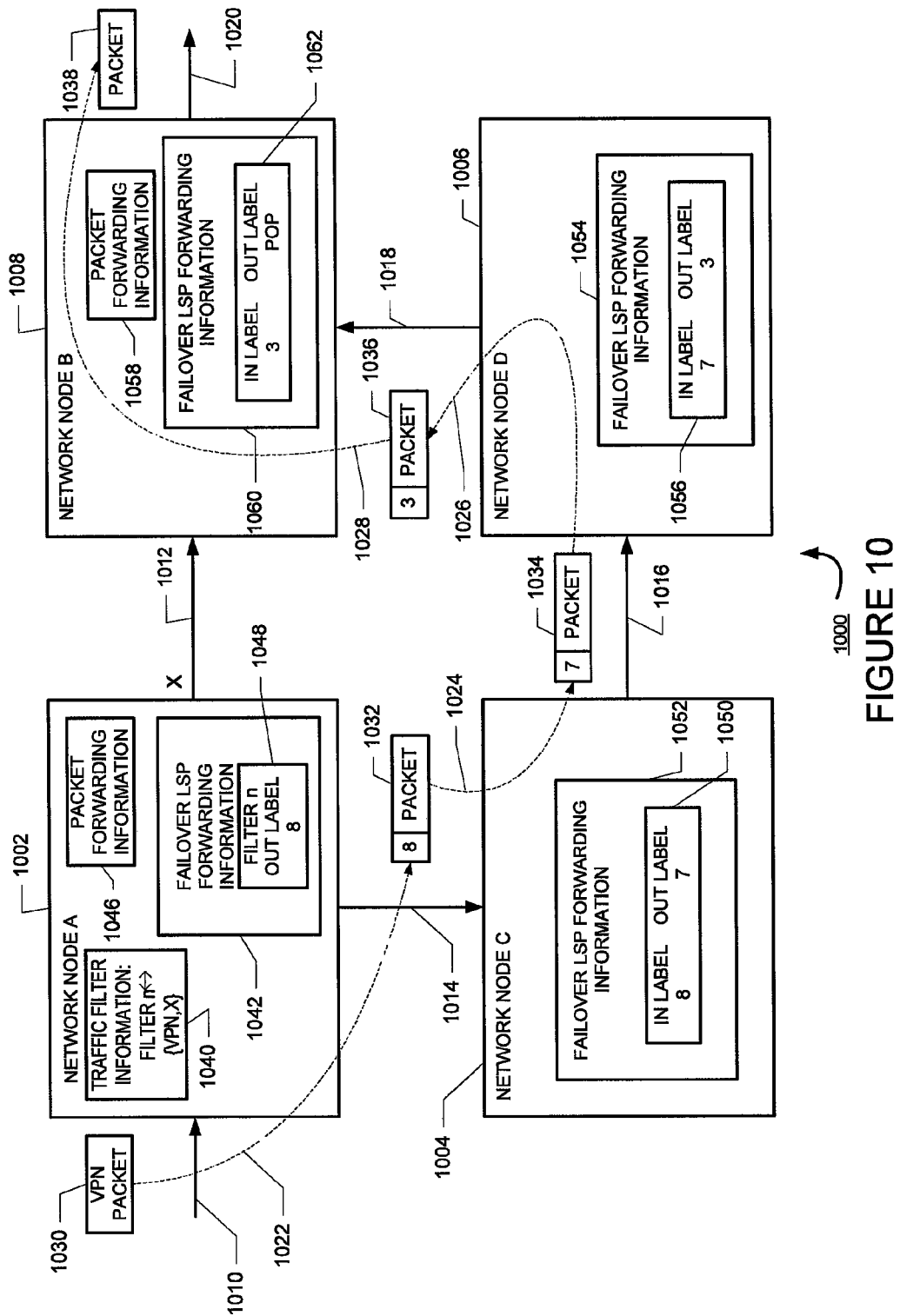
FIG. 10 illustrates an exemplary communications system implementing connection protection for a failed connection transmitting packet type data in a manner consistent with the principles of the present invention.

FIG. 10 illustrates an exemplary connection failover operation consistent with the principles of the invention, when protecting routed data in an exemplary communications network 1000. Communications network 1000 includes network nodes A-D 1002, 1004, 1006, 1008. These nodes may be similar to exemplary node 400 of FIG. 4. Network node A 1002 includes connection 1010 and is coupled to network node B 1008 via connection 1012 and is coupled to network node C 1004 via connection 1014. Network node C 1004 is coupled to network node D 1006 via connection 1016, and network node D 1006 is coupled to network node B 1008 via connection 1018. Network node B 1008 includes output connection 1020.

Network node A 1002 includes traffic filter information 1040, packet forwarding information 1046, and failover LSP forwarding information 1042, which includes label information 1048. Network node B 1008 includes packet forwarding information 1058, and failover LSP forwarding information 1060, which includes label information 1062. Network node C 1004 includes failover LSP forwarding information 1052, which includes label information 1050. Network node D 1006 includes failover LSP forwarding information 1054, which includes label information 1056.

During normal network operations, network node A 1002 transmits data to network node B 1008 via connection 1012. A network operator may want to failover connection 1012 in case it fails. In such a situation, a network operator can, for example, configure a failover LSP that may be used to failover data transmitted over connection 1012.

The control plane of network node A 1002 may be used to determine a failover LSP that begins at node A 1002, passes through nodes C 1004 and D 1006, before ending at node B 1008. (In another exemplary embodiment, the failover LSP may end at node D 1006.) The control plane of network node A 1002 uses traffic filter information 1040 and packet forwarding information 1046 to determine the type of information that normally uses connection 1012 to be backed up by the LSP. It is possible to create multiple LSPs for different types of data. The next hop information of the failover LSP is stored as forwarding information. More specifically, the next hop information of the failover LSP may be stored as an additional next-hop gateway.

If connection 1012 fails, network node A 1002 switches the next hop information of protected data over connection 1012 from its normal next hop to the next hop of its designated failover LSP. In some embodiments, the failover LSP next hop is set with a high metric value. For example, packet 1030 represents protected data. Normally the next hop for packet 1030 is from network node A 1002 to network node B 1008 via connection 1012. In this example, connection 1012 has failed. Therefore, following the path of packet 1030 illustrated by arrow 1022, a label, "8", is added (e.g., prepended) to packet 1030 to generate label-switched data 1032. Label-switched data 1032 is transmitted from node A 1002 to node C 1004 via connection 1014. Using failover LSP forwarding information 1052, the label is switched from "8" to "7" and the resulting label-switched data is transmitted to node D 1006 via connection 1016. This is represented by arrow 1024.

Network node D 1006 receives label-switched data 1034, switches its label from "7" to "3" using failover LSP forwarding information 1054, and transmits the resulting label-switched data 1036 to node B 1008 via connection 1018. This is represented by arrow 1026.

Network node B 1008 receives label-switched data 1036, and pops the label. Then, using packet forwarding information 1058, network node B 1008 transmits the received packet 1030 via connection 1020. This is represented by arrow 1028. In this manner, packet 1030 is delivered from node A 1002 to node B 1008 even though connection 1012 between the two nodes failed.

In an alternate embodiment, the failover LSP may end at node D 1006. In this embodiment the label is popped at node D 1006 and the packet 1030 is transmitted to node B 1008 as routed data, not label-switched data. Once at node D, the packet is forwarded as normal.

§4.4.2 Connection Failover Operation for Label-Switched Data

Figure 11:
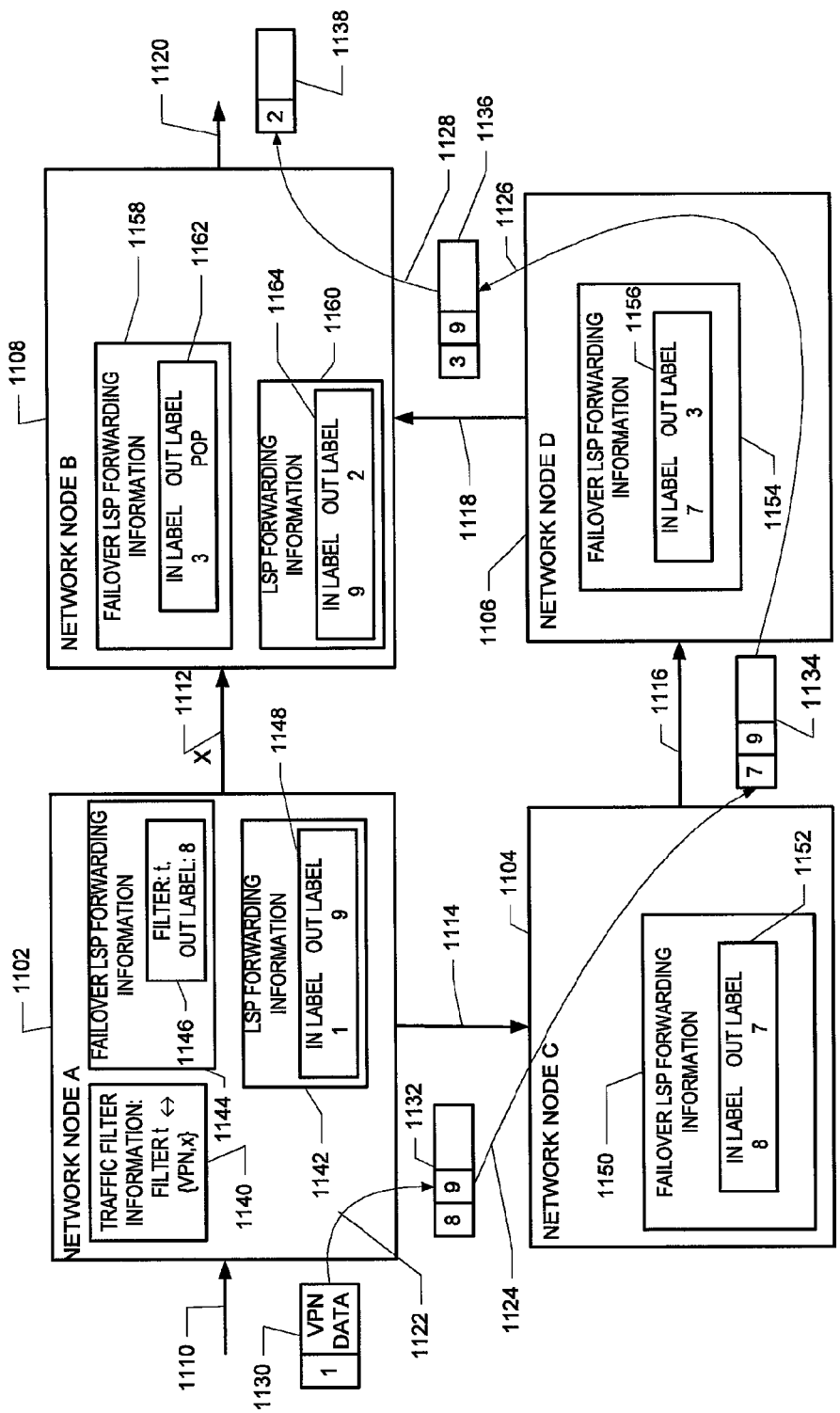
FIG. 11 illustrates an exemplary communications system implementing connection protection for a failed connection transmitting MPLS type data in a manner consistent with the principles of the present invention.

FIG. 11 illustrates an exemplary connection failover operation consistent with the principles of the invention when protecting label-switched data in an exemplary communication network 1100 (as opposed to FIG. 10 which described connection failover of routed data). Communications network 1100 includes network nodes A-D 1102, 1104, 1106, 1108. These nodes may be similar to exemplary node 400 of FIG. 4. Network node A 1102 includes input connection 1110 and is coupled to network node B 1108 via connection 1112 and is coupled to network node C 1104 via connection 1114. Network node C 1104 is coupled to network node D 1106 via connection 1116. Network node D 1106 is coupled to network node B 1108 via connection 1118. Network node B 1108 includes output connection 1120.

Network node A 1102 includes traffic filter information 1140, LSP forwarding information 1142, which includes label information 1148, and failover LSP forwarding information 1144, which includes label information 1146. Network node B 1108 includes LSP forwarding information 1160, which includes label information 1164, and failover LSP forwarding information 1158, which includes label information 1162. Network node C 1104 includes failover LSP forwarding information 1150, which includes label information 1152. Network node D 1106 includes failover LSP forwarding information 1154, which includes label information 1156.

During normal network operations, part of an LSP includes network node A 1102 and network node B 1108 using connection 1112. A network operator may want to protect the connection 1112 in case it fails. In such a situation, the network operator can create a failover LSP that may be used to protect data transmitted over connection 1112.

The control plane of network node A 1102 may be used to determine a failover LSP that begins at node A 1102, passes through node C 1104 and node D 1106, before ending at node B 1108. In another exemplary embodiment, the failover LSP may end at node D 1106. The control plane network node A 1102 uses the traffic filter information 1140 and the packet forwarding information 1146 to determine the type of information normally uses connection 1112 to be backed up by the LSP. It is possible to create multiple LSPs for different types of data. The next hop information of the failover LSP is stored as forwarding information. More specifically, the next hop information of the failover LSP may be stored as an additional next-hop gateway.

If connection 1112 fails, network node A 1102 switches the next hop information of protected data over connection 1112 from its normal next hop to the next hop of its designated failover LSP. In some embodiments the failover LSP next hop is set with a high metric value. For example, MPLS type data 1130 represents protected data. Normally, label switched VPN data 1130 with an in label of "1" has its label switched from "1" to "9" and is transmitted to network node B 1108 via connection 1112. In this example connection 1112 has failed. Therefore, following the path of label-switched VPN data 1130 illustrated by arrow 1122, a second label, "8", is stacked onto label-switched VPN data 1130 to form stacked label-switched data 1132. Stacked label-switched data 1132 is transmitted from node A 1102 to node C 1104 via connection 1114. Network node C 1104 receives the stacked label-switched data 1132 and using failover LSP forwarding information 1150, the label is switched from "8" to "7" and transmitted to node D 1106 via connection 1116. This is represented by arrow 1124.

Network node D 1106 receives stacked label-switched data 1134, switches its outer label from "7" to "3" using failover LSP forwarding information 1154, and transmits it to node B 1108 via connection 1118. This is represented by arrow 1126.

Network node B 1108 receives stacked label-switched data 1136, and pops the outer label. Then using LSP forwarding information 1160, network node B 1108 switch the inner label from "9" to "2" and transmits the label-switched data 1138 via connection 1120. This is represented by arrow 1128. In this manner, the MPLS type data 1138 is delivered to node B 1108 even though connection 1112 failed and the original LSP continues to deliver data.

In an alternate embodiment, the failover LSP may end at node D 1106. In this embodiment the outer label is popped at node D 1106 and label-switched data is transmitted to node B 1108 instead of stacked label-switched data. The received label-switched data is forwarded as normal.

§4.5 Exemplary Apparatus

Figure 12:
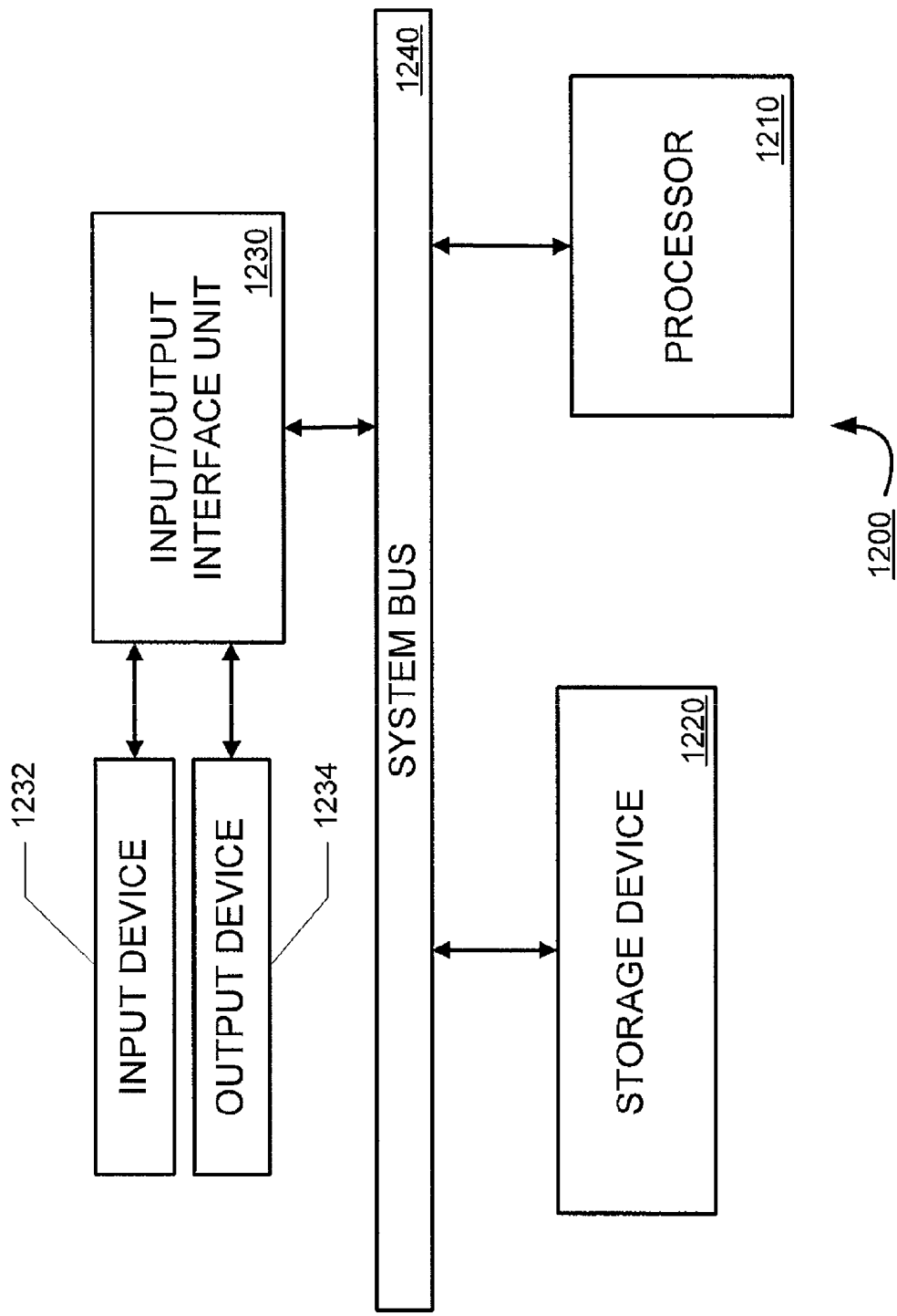
FIG. 12 is a block diagram of apparatus that may be used to perform at least some aspects of the present invention.

FIG. 12 is high-level block diagram of a machine 1200 that may be used to perform one or more of the operations discussed above. Machine 1200 may include a processor 1210, an input/output interface unit 1230, a storage device 1220, and a system bus 1240 for facilitating the communication of information among the coupled elements. An input device 1232 and an output device 1234 may be coupled with the input/output interface 1230. Operations consistent with the principles of the invention may be effected by the processor 1210 executing instructions. The instructions may be stored in storage device 1220 and/or received via input/output interface 1230. The instructions may be functionally grouped into processing modules.

Machine 1200 may be a router or an LSR, for example. In an exemplary router, processor 1210 may include a microprocessor, a network processor, (e.g., custom) integrated circuits or some combination of these. In the exemplary router, storage device 1220 may include ROM, RAM, SDRAM, SRAM, SSRAM, DRAM, flash drives, hard disk drives, flash cards, or some combination of these. At least some of storage devices 1220 may include program instructions defining an operating system, a protocol daemon, and/or other daemons. In one embodiment, methods consistent with the principles of the invention may be effected by a microprocessor executing stored program instructions (e.g., defining a part of the protocol daemon). At least a portion of the machine executable instructions may be stored (temporarily or more permanently) on storage device 1220 and/or may be received from an external source via input interface unit 1230. Finally, in the exemplary router, input/output interface unit 1230, input device 1232, and output device 1234 may include interfaces to terminate communications links.

Operations consistent with the principles of the present invention may be performed on systems other than routers. Such other systems may employ different hardware and/or software.

Exemplary machine 1200 may include other elements in addition to, or in place of, the elements listed in FIG. 12 without departing from the principles of the invention. For example, there could be one or more additional processors, input devices, storage devices, etc.

§4.6 Conclusions

The present invention allows an LSP or LSPs to be used as a failover for a protected connection. Filters allow different LSPs to protect different types of traffic. Traffic is not lost during route re-computation.

The foregoing description of embodiments consistent with the principles of the invention provides illustration and description, but is not intended to be exhaustive or to limit the invention to the precise form disclosed. Modifications and variations are possible in light of the above teachings or may be acquired from practice of the invention. For example, although a series of acts may have been described with reference to a flow diagram, the order of acts may differ in other implementations when the performance of one act is not dependent on the completion of another act. Further, non-dependent acts may be performed in parallel.

No element, act or instruction used in the description should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A processor-implemented method for configuring a failover label-switched path for a communications connection between a first node and a second node, the processor-implemented method comprising:
    a) defining a label-switched path from the first node to the second node, wherein the defined label-switched path bypasses the communications connection and is associated with at least one specific traffic type but not all traffic types;
    b) associating the communications connection with the defined label-switched path; and
    c) updating forwarding information that uses the communications connection in its next hop to include the defined label-switched path associated with the failed communications connection,
        wherein the processor includes at least one of a microprocessor, a network processor and integrated circuits.

2. The processor-implemented method of claim 1 wherein the defined label-switched path from the first node to the second node is determined based on a constraint-based shortest path first technique.

3. The processor-implemented method of claim 2 wherein the constraint-based shortest path first technique is subject to the constraint that the path exclude the communications connection.

4. The processor-implemented method of claim 1 further comprising:
    d) detecting a failure in the communications connection; and
    e) updating the forwarding information so that the communications connection will not be used to forward received data.

5. The processor-implemented method of claim 4 further comprising:
    f) re-computing a route in view of the failed communications connection, wherein the received data continues to be forwarded while the route is recomputed.

6. The processor-implemented method of claim 5 further comprising:
    g) updating, when the route is recomputed, the forwarding information.

7. The processor-implemented method of claim 1 wherein the forwarding information associated with the defined label-switched path has a high metrics value.

8. The processor-implemented method of claim 1, wherein the traffic type is one of (A) OSPF, (B) IS-IS, (C) BGP, or (D) VPN.

9. A node adapted to terminate a communications connection between it and another node, the node comprising:
    a) at least one storage device for storing
        i) an association of a first traffic type with a first failover label-switched path,
        ii) an association of a second traffic type with a second failover label-switched path, and
        iii) forwarding information used to forward received data;
    b) a forwarding facility adapted to receive data to be forwarded; and
    c) a communications connection failover facility for protecting received data to be forwarded over the communications connection when the communications connection has failed, the communication connection failover facility adapted to
        i) determine whether the received data is one of the first traffic type and the second traffic type,
        ii) responsive to a determination that the received data is of the first traffic type, selecting the first failover label-switched path associated with the first traffic type, and responsive to a determination that the received data is of the second traffic type, selecting the second failover label-switched path associated with the second traffic type, and
        iv) forwarding the received data over the selected one of the first and second failover label-switched paths.

10. The node claim 9 wherein the first traffic type is one of (A) intra-domain, (B) inter-domain, and MPLS-tunneled, and wherein the second traffic type is another one of (A) intra-domain, (B) inter-domain, and MPLS-tunneled.

11. The node of claim 9 wherein the first traffic type is one of (A) OSPF, (B) IS-IS, (C) BGP, and (D) VPN, and wherein the second traffic type is another one of (A) OSPF, (B) IS-IS, (C) BGP, and (D) VPN.

12. The node of claim 9, wherein the forwarding facility is adapted to create a first additional next-hop gateway corresponding to the first failover label-switched path and a second additional next-hop gateway corresponding to the second failover label-switched path, wherein each of the first and second additional next-hop gateways has a high metrics value.

13. A processor-implemented method for configuring failover label-switched paths for a communications connection between a first node and a second node, the processor-implemented method comprising:
 a) defining a first label-switched path from the first node to the second node, wherein the first label-switched path bypasses the communications connection;
 b) defining a second label-switched path from the first node to the second node, wherein the second label-switched path bypasses the communications connection, and wherein the second label-switched path differs from the first label-switched path;
 c) for all active routes of a first type that use the communications connection, creating a first additional next-hop gateway corresponding to the first label-switched path; and
 d) for all active routes of a second type that use the communications connection, creating a second additional next-hop gateway corresponding to the second label-switched path,
  wherein the processor includes at least one of a microprocessor, a network processor and integrated circuits.

14. The processor-implemented method of claim 13 wherein the routes of a first type are one of (A) intra-domain routes, (B) inter-domain routes, and MPLS-tunneled routes, and wherein the routes of a second type are another one of (A) intra-domain routes, (B) inter-domain routes, and MPLS-tunneled routes.

15. The processor-implemented method of claim 13 wherein the routes of a first type are one of (A) OSPF, (B) IS-IS, (C) BGP, and (D) VPN, and wherein the rouets of a second type are another one of (A) OSPF, (B) IS-IS, (C) BGP, and (D) VPN.

16. The processor-implemented method of claim 13 wherein each of the first and second additional next-hop gateways has a high metrics value.

17. The processor-implemented method of claim 13 wherein each of the first and second additional next-hop gateways are activated upon failure of the communications connection.

18. The processor implemented method of claim 13 further comprising:
 e) determining whether data received at the first node is one of the first type and the second type;
 f) responsive to a determination that the received data is of the first traffic type, selecting the first label-switched path associated with the first type, and responsive to a determination that the received data is of the second type, selecting the second label-switched path associated with the second type; and
 g) forwarding the received data over the selected one of the first and second label-switched paths.

* * * * *